Aug. 25, 1953   G. W. CRABTREE   2,649,938
HYDRAULIC SPRING CONTROL MEANS
Filed Dec. 16, 1949   2 Sheets-Sheet 1
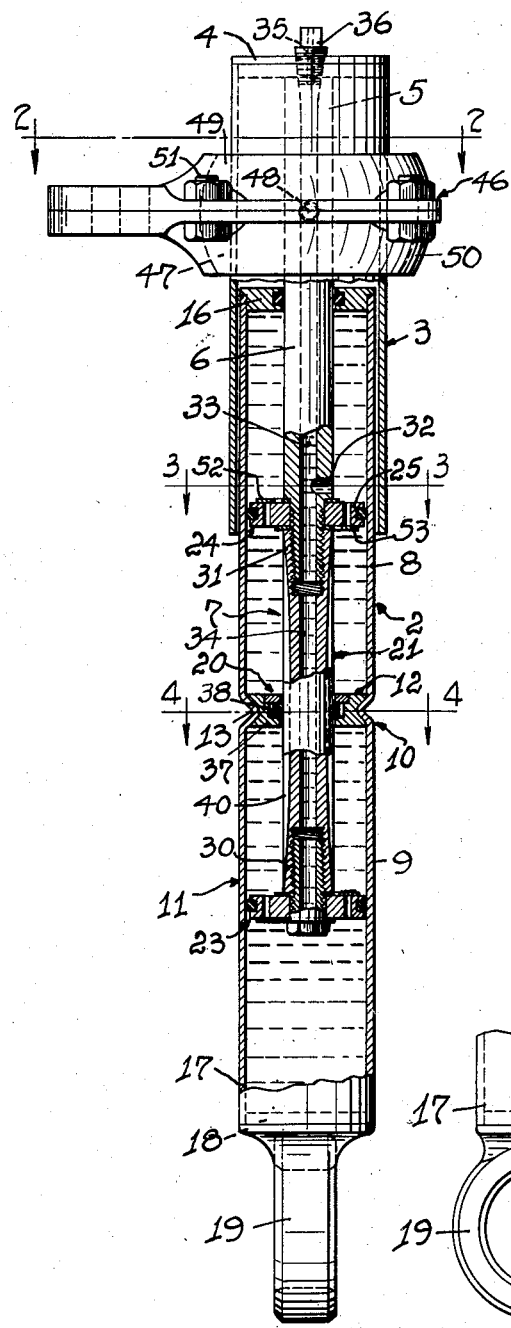
Fig. 1
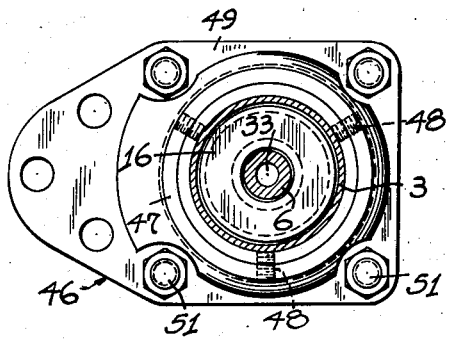
Fig. 2
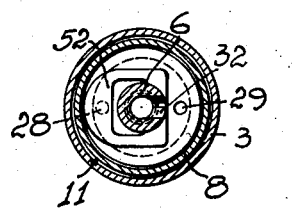
Fig. 3
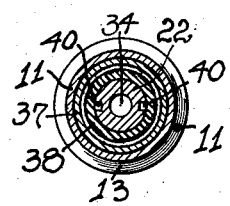
Fig. 4
Fig. 5
INVENTOR.
GEORGE W. CRABTREE
BY
Gustav A. Wolff
ATT.

Aug. 25, 1953  G. W. CRABTREE  2,649,938
HYDRAULIC SPRING CONTROL MEANS
Filed Dec. 16, 1949  2 Sheets-Sheet 2

INVENTOR.
GEORGE W. CRABTREE
BY
*Gustav Q. Wolff*
ATT

Patented Aug. 25, 1953

2,649,938

UNITED STATES PATENT OFFICE 2,649,938

HYDRAULIC SPRING CONTROL MEANS

George W. Crabtree, Cleveland Heights, Ohio

Application December 16, 1949, Serial No. 133,416

1 Claim. (Cl. 188—100)

The present invention relates to hydraulic spring controlling units of the directly actuated type which check and retard movements of vehicle springs under compression and their reflex actions under rebound by forcible displacement of liquid from one end of a working chamber to its other end and vice versa and, which for high efficiency include means adapted to automatically effect replacing of leaked liquid from the working chamber to prevent forming of air and vapor bubbles in such chamber. These hydraulic spring controlling units displace liquid from one end of the working chamber to its other end, or vice versa, by forcing such liquid through restricted passage means of definite cross section and, therefore, checking and retarding actions of these units are generally directly proportionate to the forces actuating the units.

The general object of this invention is the provision of hydraulic spring controlling units of the type referred to above which include passage means constructed to differentially change in checking operations their liquid passage areas so as to permit predetermined, fully controlled differential checking action of the units. Such a general object of the invention is attained by passage means composed of intersleeved cooperating stationary and shiftable members one of which is formed with channel means having differentially varying cross sectional areas to effect by relative shifting of the members with respect to each other differential changes in the cross sectional passage area of the passage means.

Another object of the invention, therefore, is the provision of hydraulic spring controlling units of the type referred to above in which the passage means consist of intersleeved, cooperating members relatively shiftable with respect to each other with one of these members formed with channel means having differentially varying cross sectional areas to effect by shifting of the members with respect to each other differential changes in the cross sectional passage area of the passage means.

A further object of the invention is the provision of a double-acting hydraulic spring controlling unit in which a liquid-filled working chamber subdivided by a separating wall in two individual cylinders cooperates with a piston couple having spaced pistons arranged in said cylinders, the pistons being connected by a spacing member extended through a central bore in said wall, and the unit including passage means connecting said cylinders with each other, which passage means are formed by channel-like groove means of differentially varying cross sectional area in the spacing member to effect differential changes in the cross sectional passage area of such passage means when in checking operations the piston couple travels in said cylinders and the spacing member in the bore of the separating wall.

Additional objects and novel features of construction, combinations and relations of parts by which the objects in view have been attained, will appear and are set forth in detail in the course of the following specification.

The drawings accompanying and forming part of the specification illustrate certain practical embodiments of the invention, but it will be apparent as the specification proceeds that the structure may be modified and changed in various ways without departure from the true spirit and broad scope of the invention.

In the drawings:

Fig. 1 is a sectional view, partly in elevation, showing a double-acting hydraulic spring controlling unit embodying the invention.

Fig. 2 is a cross-sectional view taken on line 2—2 of Fig. 1;

Fig. 3 is a cross-sectional view taken on line 3—3 of Fig. 1;

Fig. 4 is a cross-sectional view taken on line 4—4 of Fig. 1;

Fig. 5 is a fragmentary side view of the lower end portion of the spring controlling unit shown in Fig. 1;

Fig. 8 is a sectional view through the housing top member of the wall member;

Fig. 9 is a sectional view through the guide and sealing element of the wall member, and Fig. 10 is a sectional view of the housing of the wall member;

Figures 6, 14:
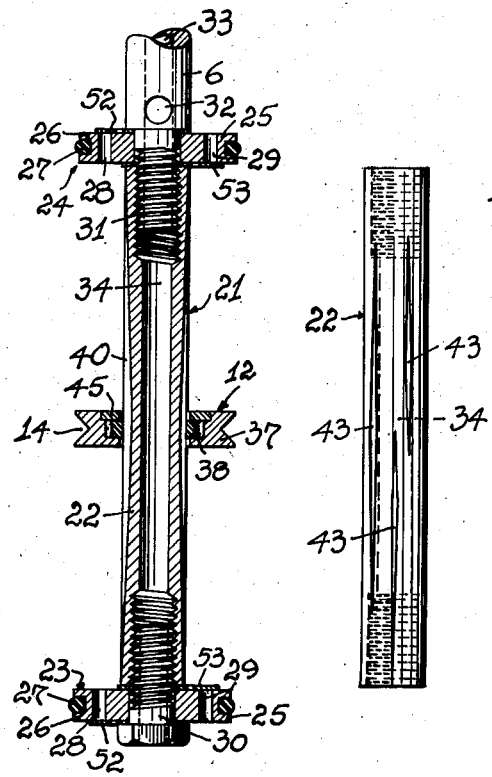
Fig. 6 is a longitudinal sectional view through the piston device and the wall member subdividing the working chamber of the unit into two communicating cylinders.
Fig. 14 is a view of still another modified form of such a member.
Figure 7:
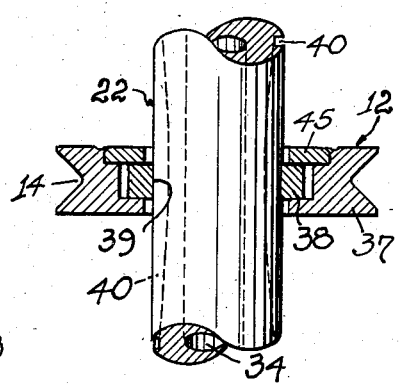
Fig. 7 is an enlarged sectional view through the wall member.
Figure 8:
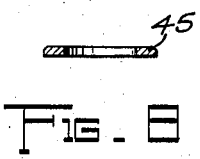
Figs. 8 through 10 show the individual parts of the wall member, thus.
Figure 9:
Figure 10:

Referring now in detail to the exemplified form of the structure shown in the drawings to illustrate the invention, numeral 2 denotes a double-acting hydraulic spring controlling unit corresponding in general outline to the structure disclosed in my co-pending application Ser. No. 123,016, filed October 22, 1949. This unit includes a tubular shielding sleeve 3 closed at its upper end by a top plate 4, which has secured to the top plate the end 5 of a tubular piston rod 6 of a piston device 7. The piston device cooperates with the two cylinders 8 and 9 of a working chamber arrangement 10 which consists of an elongated tube member 11 subdivided into said two cylinders 8 and 9 by a chambered circular wall member 12. Preferably, as shown, wall member 12 is rigidly secured to tube member 11 by circumferentially forcing its wall as shown at 13 into a peripheral V-shaped groove 14 of the member 12. Tube member 11 is closed at its upper end 15 by a ring-shaped plate 16 and at its lower end 17 by a plate 18 mounting a ring 19 for a purpose later to be described. The two cylinders 8 and 9 are axially aligned and form the working chamber arrangement 10 for piston device 7 which in shock absorbing operations forcibly shifts liquid from one cylinder through passage means 20 (to be described later) into the other one of said cylinders, and vice versa.

The piston device 7 consists of a piston couple 21 embodying a tubular rod 22 mounting on its opposite ends pistons 23 and 24. Piston 23 consists of a channeled disk 25 which mounts in its circumferential channel 26 a rubber ring 27, including valve controlled passages 28 and 29, and is secured to tubular rod 22 by a tubular screw member 30; and piston 24 is constructed similar to piston 23 and secured to tubular rod 22 by a reduced, threaded end portion 31 on tubular piston rod 6. A cross bore 32 in piston rod 6 intersecting its axial passage 33 permits open communication of cylinder 8 with the axial passage 34 in tubular rod 22 and the axial passage 33 in piston rod 6 permits filling of the spring controlling unit through a threaded opening 35 in the top plate 4 which opening is closed by a breather plug 36.

The piston couple 21 is dimensioned to position its pistons 24 and 23 in the two cylinders 8 and 9 and the axially perforated wall member 12, including in its chambered housing 37 an axially perforated guide and sealing member 38, has extended through its housing and the bore 39 in sealing member 38 the tubular rod 22 all for the purpose of permitting in shock-absorbing operations axial and lateral movements of working chamber arrangement 10 and the piston couple 21 with respect to each other.

The wall member 12 and the tubular rod 22 cooperate to form the passage means 20 which latter control communication between cylinders 8 and 9. These passage means are constructed to effect differential changes in the cross section of their liquid passing area to afford a predeterminable differentiating choking action on the liquid displaced from one cylinder of the working chamber arrangement to its other one and vice versa.

Figures 11, 12, 13:
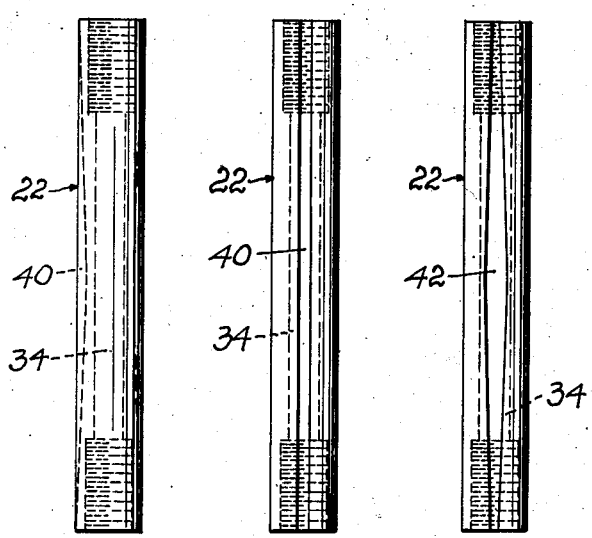
Fig. 11 is a front view of the member connecting and spacing the pistons of the piston device.
Fig. 12 is a side view of Fig. 11.
Fig. 13 is a view similar to Fig. 12 showing a modified form of the member shown in said figure.

Such differentiated, predetermined choking action of passage means 20 is effected by the provision of channel-like elongated recesses or grooves 40 in tubular rod 22 which grooves extend substantially lengthwise of the tubular rod and differentially increase or decrease in depth— see grooves 40 in Figs. 6, 7 and 11, 12—which differentially increase or decrease in width—see grooves 42 in Fig. 13—and which differentially increase or decrease in depth and width—see grooves 43 in Fig. 14—to automatically change the cross section of the liquid passing area of the passage means when, in checking operations, tubular rod 22 travels longitudinally with respect to the rigidly supported wall member 12 or vice versa. Such differentiated choking action of passage means 20 is effected without leakage of liquid from one cylinder to the other, as wall member 12 mounts in its housing 37 the guide and sealing member 38 held in said housing by its top member 45 which is secured thereto in any suitable manner as for example by peening the inner edge of the recessed top over such top member.

The hydraulic spring controlling unit is secured to the frame and axle of an automobile by ring 19 on plate 18 and a bracket member 46 universally shiftably mounted on a ring 47 of spherical shape. This ring is secured to the tubular shielding sleeve 3 by set screws 48, an arrangement permitting shifting of the ring on the shielding sleeve to any desired position. Bracket member 46 embodies two symmetrically constructed portions 49 and 50 which are secured to each other by bolts 51. When attached to the frame and axle of an automobile, relative movements between said frame and axle effect shifting of the piston couple 21 in cylinders 8 and 9. On the downward stroke of the piston couple, piston 24 in cylinder 8 forces liquid from cylinder 8 through the passage means 20 into cylinder 9, and piston 23 in cylinder 9 shifts liquid from cylinder 9 unimpeded through the communicating, axial passage 34 in tubular rod 22 into cylinder 8. In this action liquid under pressure passes through the passage means formed by the wall member 12 and the grooves in tubular rod 22, which passage means change their choking action in accordance with the varying liquid-carrying cross area of said passage means, an area fully controlled by the varying width and depth of the grooves in the tubular rod. On the upward stroke the piston couple effects in a similar manner forcible displacement of liquid from cylinder 9 into cylinder 8 and unimpeded shifting of liquid from cylinder 8 into cylinder 9, as will readily be understood from inspection of Fig. 1. The choking action of passage means 20 in this latter case is, however, directly opposite to the choking action of the passage means 20 on the downward movement of the piston couple due to the fact that the tubular rod travels in the opposite direction.

In the described hydraulic spring controlling unit leakage of liquid from cylinders 8 and 9 is practically eliminated, as liquid under pressure is present only in the inner opposed portions of the cylinders, whereas the liquid in the outer end portions of said cylinders is under atmospheric pressure and readily and unimpededly displaceable from one of these outer end portions to the other one.

Excessive choking action or breakage of these hydraulic spring controlling units under excessive compression strain is avoided by the valve controlled relief passages 28 in pistons 23 and 24, which passages are closed by valve elements 52 of sufficient stiffness to avoid under normal conditions escape of liquid from the active portions of the cylinders. Leakage of liquid from these active portions of the cylinders is counteracted by valve controlled passages 29 which are normally closed by valve elements 53 designed to readily permit communication of the active portions of the cylinders with the other portions thereof so as to automatically keep these active portions of the cylinders properly filled with liquid.

Having thus described my invention, what I claim is:

In a hydraulic spring-controlling unit an elongated cylinder subdivided into two axially aligned sub-chambers, piston members arranged in said sub-chambers and connected by piston rod means, and a ring-shaped member subdividing the cylinder into said sub-chambers, said ring-shaped member embodying a chambered circular housing and a circular sealing and guiding disk within said housing dimensioned to be radially shiftable therein, and said sealing and guiding disk including an axial bore having said piston rod means slidably extended therethrough.

GEORGE W. CRABTREE.

References Cited in the file of this patent

UNITED STATES PATENTS

| Number | Name | Date |
| --- | --- | --- |
| 1,684,433 | Crowell | Sept. 18, 1928 |
| 2,069,791 | Wallace | Feb. 9, 1937 |
| 2,225,986 | Glezen | Dec. 24, 1940 |

FOREIGN PATENTS

| Number | Country | Date |
| --- | --- | --- |
| 105,581 | Germany | June 19, 1923 |
| 244,332 | Great Britain | Dec. 17, 1925 |
| 683,278 | France | June 10, 1930 |